United States Patent
Harenbrock et al.

(10) Patent No.: US 6,893,571 B2
(45) Date of Patent: May 17, 2005

(54) METHOD AND APPARATUS FOR STORING WATER SEPARATED FROM FUEL

(75) Inventors: Michael Harenbrock, Ludwigsburg (DE); Andre Roesgen, Remshalden (DE)

(73) Assignee: Filterwerk Mann & Hummel GmbH, Ludwigsburg (DE)

( * ) Notice: Subject to any disclaimer, the term of this patent is extended or adjusted under 35 U.S.C. 154(b) by 46 days.

(21) Appl. No.: 10/310,970

(22) Filed: Dec. 6, 2002

(65) Prior Publication Data

US 2003/0121860 A1 Jul. 3, 2003

(30) Foreign Application Priority Data

Dec. 8, 2001 (DE) .......................................... 101 60 497

(51) Int. Cl.[7] .................................................. C02F 1/28
(52) U.S. Cl. ...................... 210/670; 210/690; 210/691; 210/314; 210/502.1; 210/509
(58) Field of Search .................................. 210/660, 690, 210/691, 669, 670, 314, 335, 502.1, 509; 123/509, 510, 514

(56) References Cited

U.S. PATENT DOCUMENTS

| 4,718,251 A | * | 1/1988 | Thornton | 62/475 |
| 6,444,121 B1 | * | 9/2002 | Maxwell | 210/172 |
| 2004/0062814 A1 | * | 4/2004 | Rowe et al. | 424/489 |

FOREIGN PATENT DOCUMENTS

DE  196 05 431  8/1997

* cited by examiner

Primary Examiner—Robert A. Hopkins
(74) Attorney, Agent, or Firm—Crowell & Moring LLP

(57) ABSTRACT

An apparatus for storing water separated from fuels by a fuel filter is provided. The apparatus includes an absorber connected to a water accumulator of the fuel filter. The stored water may then be released again through heating or pressure using commercially available components and supplied to a further use.

20 Claims, 2 Drawing Sheets

METHOD AND APPARATUS FOR STORING WATER SEPARATED FROM FUEL

BACKGROUND OF THE INVENTION

The present invention relates to an apparatus for storing water separated from fuel. The present invention particularly relates to such a device in which the storage is reversible.

Through its combustion in engines, fuel provides the energy which is necessary for operating, for example, a motor vehicle. The timely and precisely quantified metering of the fuel into the combustion chamber, through either direct or indirect fuel injection, optionally with prior formation of a fuel-air mixture, is decisive for optimum power yield of the combustion and therefore minimal fuel consumption. For this purpose, injection systems which ensure this exact metering have been developed in recent years (for example, common rail systems, pump-nozzle systems, etc.). For this purpose, the fuel is always supplied under high pressure and at a high temperature.

Furthermore, the dimensions of the components which meter the fuel, such as nozzles, etc., have become ever smaller, for which reason these components must be effectively protected against blockage, even by small particles. This function is assumed by the fuel filter. It removes particles, which may arise, for example, from contamination of the fuel and the parts supplying the fuel during production, from external sources, or from wear, especially wear of metallic components such as pumps.

In addition to particles, the presence of water in the fuel may also have a negative effect on the parts supplying the fuel. Possible reasons for this include, for example, corrosion, reduced lubricant effect of the fuel, etc. The current limit for water dissolved in fuel is 200 ppm. However, this value may be significantly exceeded in practice. This may be caused by, among other things, condensation of water in storage tanks under the influence of large day/night temperature differences and/or very high ambient humidity, or in the course of filling the tanks themselves.

The water may be physically dissolved and/or emulsified. In addition, the solubility of water in fuel increases when alcohols or other components which contain oxygen are admixed into the fuel, as is the case in America, for example. Therefore, a modern fuel filter must, in addition to storing solid materials, also be able to effectively separate water present in the fuel.

This is currently achieved using modern filter media. The water is typically collected in a volume located in a filter and is removed using a drain plug after reaching the maximum fill level. However, since this water may still be contaminated with fuel residues, simply draining the mixture into the environment is not acceptable, i.e., methods for separating the water/fuel mixture must be found.

The different polarities of the liquids may be utilized to separate this mixture, whereby the water preferably is absorbed on a carrier material. This carrier material may be an organic or inorganic material or compound. A preferred solution to the problem is to use polymers such as polyacrylates, polyacrylic acids, polyacrylamides, polyesters, polysaccharides, and copolymers thereof, which have outstanding water storage ability (for example, up to more than 100 g of water per g of polymer for polyacrylates), caused by a high swelling capacity. This property is used, for example, in diapers and incontinence products. The products are commercially available, for example under the trade name HySorb (BASF).

It is additionally advantageous if the storage is reversible, i.e., when the water may be expelled again, for example by increasing the temperature or pressure. Since the nonpolar fuel may remain on the polymer in this case, separation of the mixture is achieved.

Thus, for example, Published German Patent Application No. DE 196 05 431 describes a filter for absorbing water from fuels, in which the polymer is contained in a composite filter which is accommodated in a filter housing. A disadvantage of this solution is that the space available for storage is much too small to store the quantities of water which may arise, for example, in a truck.

SUMMARY OF THE INVENTION

It is therefore an object of the invention to provide an improved apparatus for storing water separated from fuel.

A further object of the invention is to provide an apparatus for separating water from fuel which has adequate storage capacity without becoming excessively large.

A further object of the present invention is to provide such a device which allows the separated water to be easily removed therefrom again.

In accordance with another aspect of the invention, it is an object to provide an improved method of storing water separated from fuel.

These and other objects are achieved in accordance with the present invention by providing an apparatus for storing water separated from fuels using a fuel filter having a water accumulator, said apparatus comprising an absorber connected to the water accumulator of the fuel filter via a connection line.

In accordance with a further aspect of the invention, the objects are achieved by providing a method of storing water separated from a fuel using a fuel filter having a water accumulator, said method comprising withdrawing water from the water accumulator to an absorber connected thereto.

In yet another aspect, the objects of the invention are achieved by providing a method of storing water separated from fuel in a fuel filter, comprising collecting water separated from the fuel in an accumulator chamber associated with the fuel filter, and transferring at least a portion of the collected water to an absorber connected to the accumulator.

Further advantageous features and embodiments are described hereinafter.

BRIEF DESCRIPTION OF THE DRAWINGS

The invention will be described in further detail hereinafter with reference to illustrative preferred embodiments shown in the accompanying drawing figures in which.

DETAILED DESCRIPTION OF PREFERRED EMBODIMENTS

The present invention provides a component which is in contact with the water accumulator volume of the fuel filter via a separate connection line. The component is an absorber which may be filled with one or more absorbents. The connection line may, for example, be made of a flexible material, for example, ethylene propylene diene terpolymers (EPDM) or may also be constructed of a rigid material.

Figure 1:
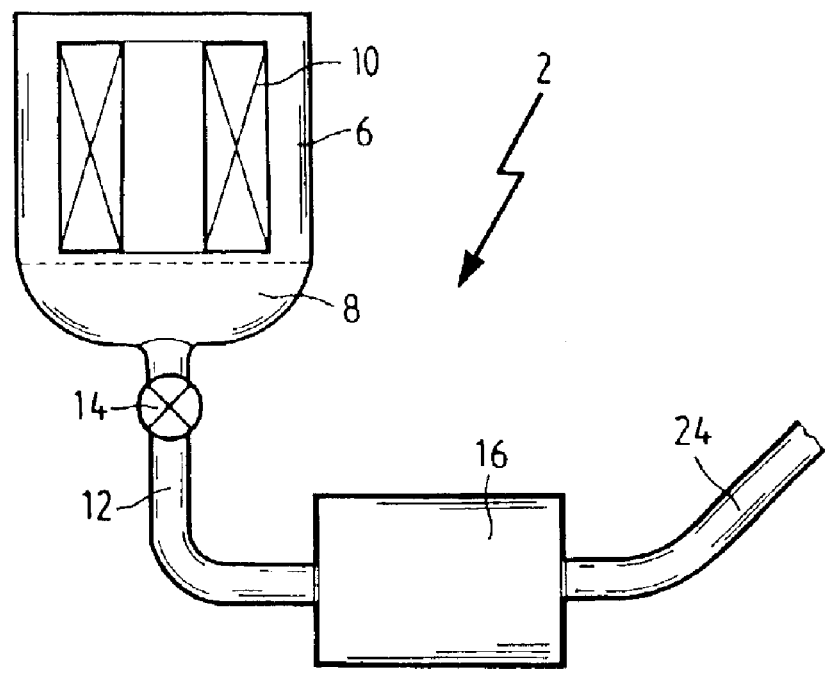
FIG. 1 is a schematic illustration of an apparatus comprising an absorber according to the present invention.

FIG. 1 schematically shows a device 2 having an absorber 16 according to the present invention. An accumulator 8 for the water crudely separated from the fuel by filter medium 10 is located in the lower region of fuel filter 6. A connection line 12, which has a closing element 14 in its upper region, near the accumulator, is connected to this accumulator 8. This closing element, for example a shutoff valve or a stopcock, is used to regulate the discharge of the crude separated water from accumulator 8 into connection line 12.

The withdrawal of water from accumulator 8 may be continuous or discontinuous in this case. For this purpose, drain valves and water sensors are necessary, which avoid the accumulator volume of accumulator 8 in fuel filter 6 being overfilled.

A component 16, which comprises an absorber made of, for example, polyacrylate, is attached to the side of connection line 12 facing away from the fuel filter. Absorber 16 is filled with one or more absorbents 18, 20 (cf. FIG. 2), which are capable of absorbing hydrocarbons from the fuel and/or water. Absorbents 18, 20 may be in fiber or in particle form (bulk material). Depending on the usage, absorbers having particle size distributions from 10–100 $\mu$m or 100–1000 $\mu$m may be used. In addition, auxiliary additives, which may bind nonpolar components via absorption or adsorption, such as activated carbon or the like, may be admixed into the absorbents. Such auxiliary additives may also be permanently bonded to the absorbents by coating them.

The water absorbents are preferably made of polymers such as polyacrylates, polyacrylic acids, polyacrylamides, polyesters, polysaccharides, and copolymers thereof, which have an outstanding water storage ability. The absorbents for the absorption of hydrocarbons from fuel are predominantly made of activated carbon, which may be treated using impregnation if necessary. However, it is within the skill of the art to use other inorganic compounds which are capable of selectively and reversibly binding water for the applications described above, such as, for example, modified zeolites, silica gels, kieselguhr or diatomaceous earths, etc.

Figure 2:
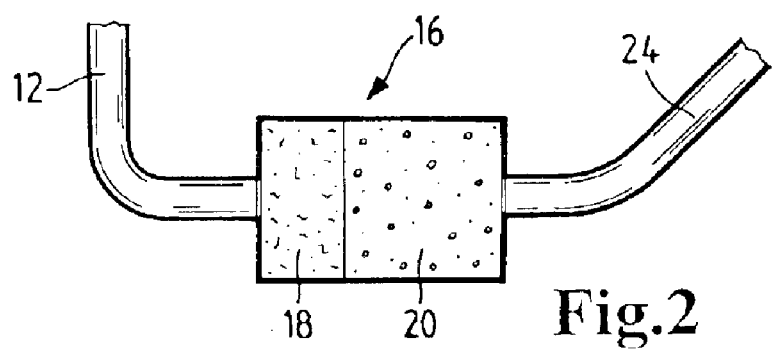
FIG. 2 shows a first embodiment of the absorber according to the present invention.

FIG. 2 shows a first embodiment of absorber 16 according to the present invention, in which it is filled with two absorbents 18, 20 for hydrocarbons and water. It is to be noted that the sequence of the absorbents is unimportant for the performance of the present invention.

Figure 3:
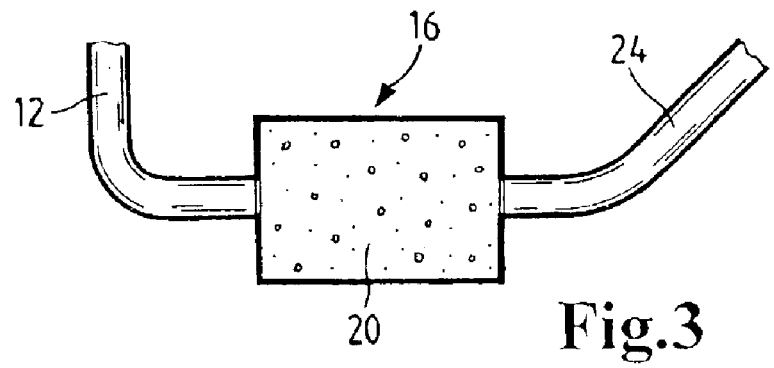
FIG. 3 shows a second absorber embodiment according to the present invention.

In FIG. 3, an embodiment of the absorber according to the present invention is shown in which absorber 16 is filled only with an absorbent 20 for absorbing water.

The water, which is purified of hydrocarbons, among other things, may now be released again through heating or pressure using commercially available components.

Figure 4:
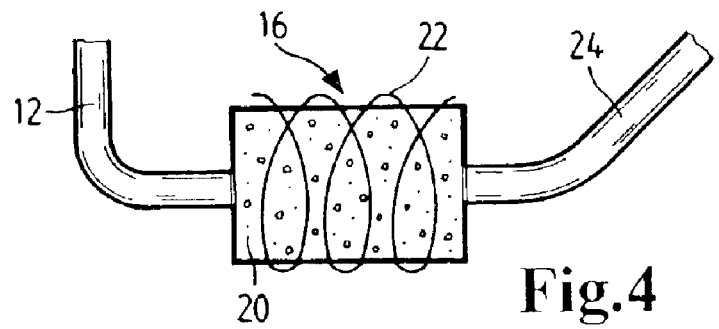
FIG. 4 shows a first embodiment of an absorber according to the present invention for recycling the stored water.

For this purpose a heating element 22 may be used, such as a heating coil, for example, which is wound around absorber 16, as shown in FIG. 4, and is switched on when the absorption capacity of the absorbent is reached, in order to thus evaporate the stored water. During the evaporation, the drain valve or closing element is closed.

The water may then be either evaporated into the environment via an opening, drained away, or even supplied to the window washing system in the motor vehicle via a further connection line 24, for example, or may be used as a fuel additive for reducing the formation of pollutants during engine combustion (lowering of the combustion temperature).

Figure 5:
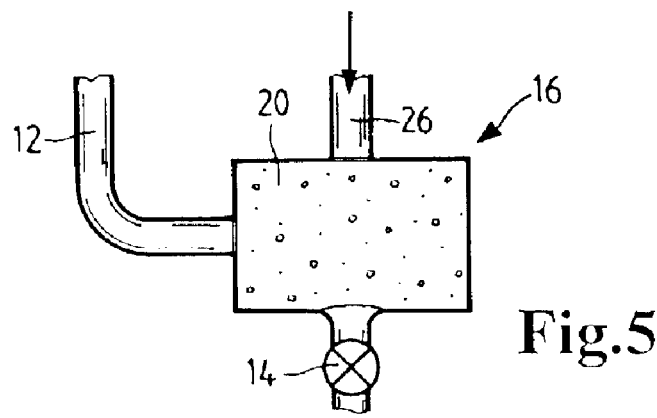
FIG. 5 shows a second embodiment of an absorber according to the present invention for recycling the stored water.

FIG. 5 shows a variant of the device according to the present invention, in which the stored water is pressed out using the application of pressure via a pressure line 26.

Figure 6:
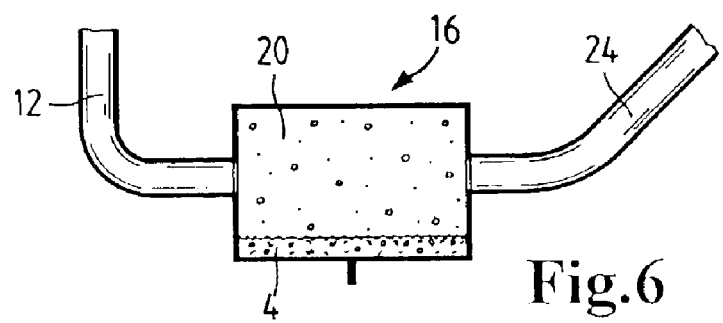
FIG. 6 shows a third embodiment of an absorber according to the present invention for recycling the stored water.

The absorption is performed with the formation of gel, the absorber powder being converted into the gel form by the stored water. The compact gel pack 4 (cf. FIG. 6), i.e. the absorber which is swelled up with water, may also removed and replaced, if desired.

Figure 7:
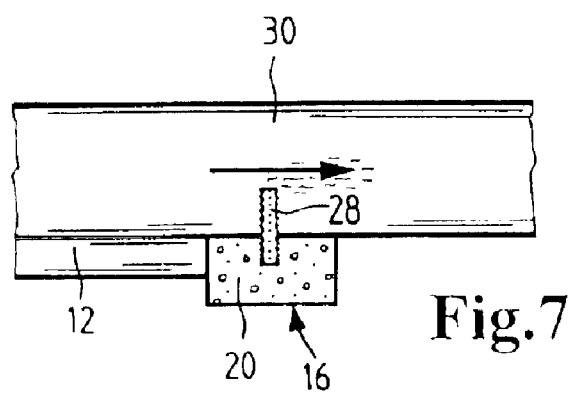
FIG. 7 shows a fourth embodiment of an absorber according to the present invention for recycling the stored water.

FIG. 7 shows a further embodiment of the absorber according to the present invention for recycling the stored water. A wick 28 is located in absorber 16. The upper half of the wick projects into the air stream (see arrow in FIG. 7) of intake system 30 of the internal combustion engine. Due to the capillary effect of the wick material (e.g. fleece, microfibers), the liquid rises upward in the wick. The water is evaporated into the air stream via the surface of the wick.

Typical quantities of liquids evaporated using a wick are 5 g/hr. for a wick surface of approximately 300 mm$^2$. Typical quantities of water which arise, for example, in a diesel filter are in the range from 2 to 30 ml/100 km.

The quantities of liquid which are returned to the engine are trivial in relation to the quantities of moisture normally introduced. The hydrocarbons also contained in the water are also combusted in the engine and are not released to the environment.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. An apparatus for storing water separated from fuels using a fuel filter having a water accumulator, said apparatus comprising an absorber connected to the water accumulator of the fuel filter via a connection line, wherein said connection line is provided with a closing element, and wherein said closing element comprises a drain valve or a stopcock.

2. An apparatus for storing water separated from fuels using a fuel filter having a water accumulator, said apparatus comprising an absorber connected to the water accumulator of the fuel filter via a connection line, wherein said connection line is provided with a closing element, and wherein said closing element comprises a sensor for checking the water level in the accumulator.

3. An apparatus for storing water separated from fuels using a fuel filter having a water accumulator, said apparatus comprising an absorber connected to the water accumulator of the fuel filter via a connection line, wherein the absorber contains at least one absorbent, and wherein the absorbent contains at least one auxiliary additive.

4. An apparatus according to claim 3, wherein said auxiliary additive binds non-polar components by absorption or adsorption.

5. An apparatus according to claim 3, wherein said auxiliary additive comprises activated carbon.

6. An apparatus for storing water separated from a liquid fuel using a fuel filter having a water accumulator, said apparatus comprising an absorber connected to the water accumulator of the fuel filter via a connection line, and further comprising means for expelling stored water from the absorber.

7. An apparatus according to claim 6, wherein said water expelling means comprises a heating element.

8. An apparatus according to claim 7, wherein the heating element is wound around the absorber.

9. An apparatus according to claim 6, wherein said water expelling means comprises means for applying pressure to the absorber.

10. An apparatus for storing water separated from fuels using a fuel filter having a water accumulator, said apparatus comprising an absorber connected to the water accumulator of the fuel filter via a connection line, wherein said absorber comprises a wick for wicking away stored water from the absorber.

11. An apparatus according to claim 10, wherein part of the wick projects into an air intake system of an internal combustion engine.

12. An apparatus for storing water separated from fuels using a fuel filter having a water accumulator, said apparatus comprising an absorber connected to the water accumulator of the fuel filter via a connection line, further comprising means for recycling stored water.

13. An apparatus according to claim 12, wherein stored water is recycled to a water supply tank of a window washing system of a motor vehicle driven by combustion of the fuel from which the water is separated.

14. An apparatus according to claim 12, wherein controlled amounts of stored water are recycled to the fuel as an additive for decreasing formation of pollutants during combustion of the fuel.

15. A method of storing water separated from a fuel using a fuel filter having a water accumulator, said method comprising withdrawing water from the water accumulator to an absorber connected thereto, wherein water is withdrawn discontinuously from the water accumulator to the abosrber.

16. A method of storing water separated from a fuel using a fuel filter having a water accumulator, said method comprising withdrawing water from the water accumulator to an absorber connected thereto, wherein the storage of the water in the absorber is reversible.

17. A method according to claim 16, wherein the storage is reversed by increasing the pressure.

18. A method of storing water separated from a fuel using a fuel filter having a water accumulator, said method comprising withdrawing water from the water accumulator to an absorber connected thereto, wherein the storage of the water in the absorber is reversible, and wherein stored water is drawn away by a wick disposed in the absorber and evaporated.

19. A method according to claim 18, wherein the water is evaporated from the surface of the wick into the air intake system of an internal combustion engine.

20. A method of storing water separated from a fuel using a fuel filter having a water accumulator, said method comprising withdrawing water from the water accumulator to an absorber connected thereto, wherein the storage of the water in the absorber is reversible, further comprising expelling water from the absorber for use as a fuel additive for decreasing formation of pollutants during combustion of the fuel or for supplying a water supply tank of a window washing system of a motor vehicle driven by combustion of the fuel from which the water is separated.

\* \* \* \* \*